(12) United States Patent
Grovender et al.

(10) Patent No.: US 6,719,317 B1
(45) Date of Patent: Apr. 13, 2004

(54) PONTOON BOAT TRAILER

(76) Inventors: Donald J. Grovender, 16156 5th Ave., South Haven, Stearns County, MN (US) 55382; David L. Grovender, 11780 County Rd. 51, St. Joseph Stearns, MN (US) 56374

( * ) Notice: Subject to any disclaimer, the term of this patent is extended or adjusted under 35 U.S.C. 154(b) by 0 days.

(21) Appl. No.: 10/167,566

(22) Filed: Jun. 11, 2002

Related U.S. Application Data

(60) Provisional application No. 60/297,331, filed on Jun. 11, 2001.

(51) Int. Cl.$^7$ ................................ B60P 3/10; B60P 1/52
(52) U.S. Cl. ................................ 280/414.1; 414/495
(58) Field of Search ................ 280/414.1; 414/495, 414/496

(56) References Cited

U.S. PATENT DOCUMENTS

| | | | | |
|---|---|---|---|---|
| 3,768,677 A | | 10/1973 | Moss | |
| 3,974,924 A | * | 8/1976 | Ullman, Jr. | 414/531 |
| 4,395,185 A | * | 7/1983 | Whaley | 414/483 |
| 4,637,770 A | * | 1/1987 | Swadell | 414/495 |
| 4,801,153 A | * | 1/1989 | Wilson | 280/414.1 |
| 5,004,260 A | | 4/1991 | Smyly, Sr. | |
| 5,013,206 A | | 5/1991 | Ernst et al. | |
| 5,133,571 A | | 7/1992 | Urbank | |
| 5,152,657 A | | 10/1992 | Kehne | |
| 5,292,145 A | | 3/1994 | Ostrand | |
| 6,003,888 A | * | 12/1999 | Godbersen | 280/124.169 |

* cited by examiner

Primary Examiner—Kevin Hurley
(74) Attorney, Agent, or Firm—Albert W Watkins

(57) ABSTRACT

A self-loading and unloading trailer which can be operated by a single person to load a boat from difficult boat ramps or even directly from the ground provides rollers for engaging a boat. A first set of rollers engages the boat at ground level, enabling the boat to be winched directly from the ground or from a shallow landing. As the boat is loaded, the rollers shift and transfer the load directly to a second set of rollers. Finally, the boat weight shifts the trailer again, causing the rollers to retract, thereby bringing the boat to safely rest on bunks for storage or during transit. In the preferred embodiment, the boat is a pontoon boat, though other appropriate boat hulls are contemplated for use with the present invention.

12 Claims, 4 Drawing Sheets

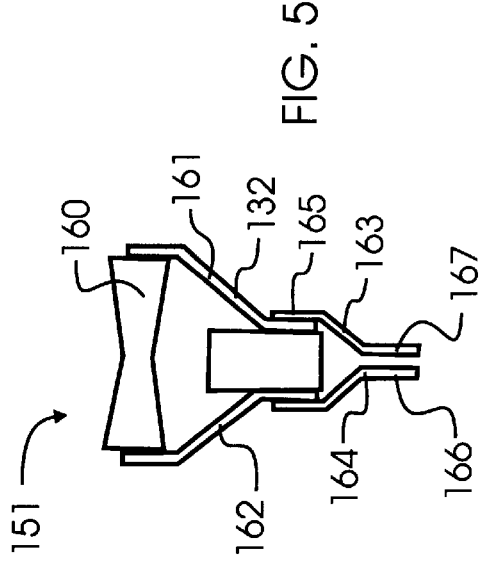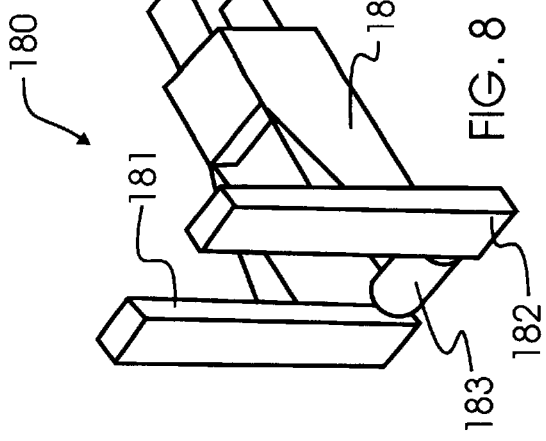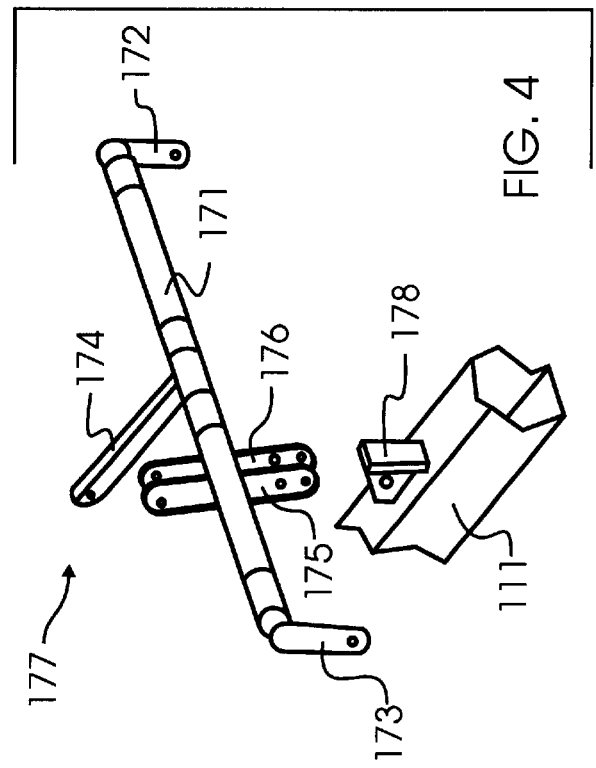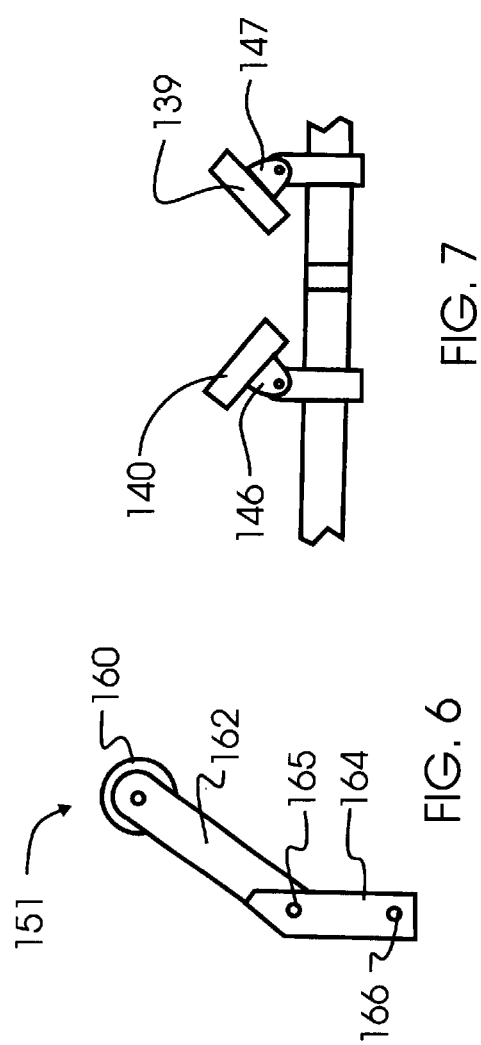

PONTOON BOAT TRAILER

CROSS REFERENCE TO RELATED APPLICATIONS

This application claims priority to U.S. provisional patent application serial No. 60/297,331 filed Jun. 11, 2001.

BACKGROUND OF THE INVENTION

1. Field of the Invention

The present invention pertains generally to land vehicles, and more particularly to wheeled, articulated vehicles constructed to accommodate a boat for transport. In an even more particular manifestation, the invention pertains to self-loading pontoon boat trailers.

2. Description of the Related Art

Boats of all sorts and types, used variously for leisure, sport and commerce, are transported upon an equally diverse collection of trailers. Trailers offer a number of benefits over transporting a boat directly upon an automobile, sport utility vehicle, pick-up truck, flat-bed truck, or the like. Among these benefits are loading and unloading the boat at an elevation closer to the ground; the ability to unload the boat directly into a waterway and reload the boat therefrom while still maintaining vehicle drive wheels upon dry ground for good traction; ready storage by simply unhitching the trailer from the vehicle, with associated rapid and simple retrieval from storage; and the ability to load and transport boats much longer than the motor vehicle. Since in some instances the boats are loaded or unloaded on a daily basis, these trailers most preferably simplify the loading and unloading process.

One of the more common techniques for supporting a boat upon a trailer uses rollers, which assist a person greatly with the loading and unloading of the boat. A hand or powered winch may be provided which draws the boat onto and across the rollers. Since the rollers are able to roll across the exterior of the boat, such as along the keel or along the port or starboard undersides, there is almost no scraping or sliding of the boat which would otherwise damage the boat, and there is very little force required to move the boat over the rollers. Consequently, a winch and cable may be hand-turned in many instances, and such winch and cable are generally relatively low cost commodity items.

While the rollers tend to simplify the loading and unloading of a boat, they do not provide good support for the boat. This is because the rollers normally have very little surface area in contact with the boat hull. At the point of contact, the forces placed upon the boat bull by the total weight of the boat and contents may cause the boat hull to deform. Even absent noticeable deformation, the stresses generated adjacent a roller tend to be very high, leading to premature failure of the boat hull. While additional contact may be obtained with the use of more rollers, which would thereby reduce the stress between the boat and any given roller, rollers tend to be relatively expensive. Consequently, supporting more than a very minor amount of surface area on the boat with rollers is cost prohibitive.

In contrast, another common technique for supporting a boat upon a trailer uses bunks, which are solid surfaces against which a boat hull is rested. In the case of a bunk trailer, the boat hull is solidly supported across the entire bunk, rather than across a few square inches of roller. Since the bunk is very low-cost, typically comprising little more than a beam having a non-marring surface, the cost of supporting a large surface area is quite small. This in turn leads to much better transport, including a substantial reduction in the stress forces generated within the boat hull and a resultant reduction in the likelihood for damage to the boat during transport. Unfortunately, this type of trailer creates much greater friction between the bunk and boat during loading and unloading, thereby necessitating a much more powerful winch. Additionally, should any foreign particles or devices or substances work their way between the boat hull and the bunk, these particles may cause substantial damage to the boat hull.

In some cases, prior art trailers are designed to accommodate several different types of boats with distinct hull designs. However, most trailers are designed for only one or a limited few types of boat hulls. For example, a trailer designed to carry a typical fishing boat will be shaped to accommodate the relatively deep keel and steeply sloping sides of the boat. In contrast, a shallow water boat or jon boat is designed with a relatively flat bottom. Consequently, a carrier designed to receive the keel and steep sides of a fishing boat will not receive and support a flat-bottom boat. The same holds true for other diverse types of boats, such as catamarans and pontoon boats, each which also have unique hull designs. These and other types of boats have consequently required specific trailer designs or accommodations.

In the specific case of a pontoon boat, the boat will generally include two or more pontoons, which are elongated tubes that may typically be sealed and hold air or another gas therein. Most commonly, across the top of the pontoons there will be attached a deck which supports passengers, a boat engine, and other various components, while simultaneously fixing the position of the pontoons relative to each other.

Pontoon boats have presented some challenges to trailer design that are relatively unique, for which desirable solutions have heretofore been elusive. Among these are the wide spacing of the pontoons. The pontoons, which are generally among the lowest components of a boat, are placed adjacent the edges of the deck in order to provide optimum floatation for passengers who may also be standing adjacent the deck edge. This spacing between pontoons makes for safer boating. Unfortunately, it also makes trailer design somewhat more difficult than with other types of boat hulls. This is because any support for a boat upon a trailer will most preferably be at the outer edges of the boat, so that as the trailer is turning a corner, for example, the boat is securely supported and does not tip over. Unfortunately, in the case of a pontoon boat and bunk trailer, support adjacent the outer edges of the boat also means raising the boat somewhat more off of the ground than would be required for a support more centrally located. Consequently, the elevated support may tend to be more difficult to load, and will typically require a relatively deep boat landing in order for the trailer to drop far enough for the pontoons to float off of the trailer.

Further limitation stems from the fact that unloading the boat from a prior art bunk trailer upon dry land is only practical if the operator has access to a small fork lift, skid steer or the like. The weight of a pontoon boat is measured in the thousands of pounds. The pontoons themselves, when resting upon the bunks, will not readily slide. Loading presents the same dilemma, since the pontoons will not slide along the earth. Consequently, an automobile will more readily slide along the ground than the pontoon boat. Winching the boat onto the trailer is therefore not practical.

To resolve these difficulties, another type of trailer has been designed specifically for pontoon boats, referred to in the prior art as a scissors-type trailer. Scissors trailers operate similar to a scissors jack, where the movement of a screw is used to separate or bring together two base elements. The spreading of these base elements will generally lower the trailer top, and a boat supported thereon, closer to the ground. Bringing the elements together will, through the scissors mechanism, raise the top of the trailer and the supported pontoon boat. With these scissors trailers, several distinct benefits and advantages are obtained in the transport of pontoon boats that are not available with bunk trailers. Most important to many pontoon boat owners is the ability to load and unload the pontoon boat in extremely shallow waters, or directly from the ground. Rephrased, the scissors trailer is designed to slip in the space between pontoons immediately under the deck, and then is used to jack the pontoons upward off of the ground or out of the water sufficiently to allow the boat to be transported safely. Unfortunately, since the trailer must first pass between the pontoons, the transverse distance across the trailer between wheels is significantly less than the width of the pontoons. Any significant elevation provided by the scissors trailer tends to make the trailer much more inclined to roll over, since the weight of the boat extends outside of the wheels. Such roll-overs have the potential for causing great harm not only to the supported pontoon boat, but also to other persons and property which the boats would then collide with.

U.S. Pat. No. 5,292,145 by Ostrand, the contents which are incorporated herein in entirety by reference for the teachings of trailer and roller construction, illustrates a prior art trailer for a standard fishing boat or the like that supports a boat upon roller assemblies during loading and unloading and uses bunks for transport. In the Ostrand patent, an operator-activated motor-driven actuator retracts the rollers to allow the boat to rest upon bunks during transport. While the Ostrand patent may, at least in principal, appear to address one of the concerns of the prior art by combining bunks and rollers, this patent does not offer any benefit or advantage for loading and unloading adjacent the ground. Furthermore, two separate motive power devices are required to control this trailer. The first device is the winch, which is used to pull the boat onto the trailer. The second is the actuator, which is used to engage and disengage the rollers. There is no attempt to integrate these two separate functions into one, nor to assist with ground-level loading. Consequently, to load a boat with the Ostrand trailer, an operator must first back the trailer sufficiently under the boat to engage the rollers. Noteworthy here is the fact that, in practice, the level of the elevated rollers is the exact same level required for the boat to clear the bunks in the first place. In other words, during water launching and loading, the Ostrand rollers add no value to the trailer, since the operator will float the boat off of or onto the bunks. Since on dry land the boat must be raised to the elevation of the trailer, the rollers illustrated therein also add very little to a dry land loading and unloading. Consequently, the additional structure and expense offers very limited value in actual practice, while adding substantial cost and expense. Additional documents incorporated herein by reference for related teachings include U.S. Pat. No. 5,152,657 by Kehne; U.S. Pat. No. 5,133,571 by Urbank; U.S. Pat. No. 5,013,206 by Ernst et al; U.S. Pat. No. 5,004,260 by Smyly; and U.S. Pat. No. 3,768,677 by Moss, though none illustrate or teach the features and benefits of the present invention.

SUMMARY OF THE INVENTION

In a first manifestation, the invention is a boat trailer having support bunks which are active during boat transport for supporting a boat in combination with rollers that are moved during loading and unloading into an active position. The trailer includes a trailer bed with a ground-engaging wheel and a boat support frame having support bunks and rollers supported thereon. A pivot between the boat support frame and trailer bed allows the boat support frame to rotate relative to trailer bed. An actuator elevates the rollers relative to boat support frame responsive to a rotation between the boat support frame and trailer bed.

In a second manifestation, the invention is a method of loading a pontoon boat onto support blocks supported on a support frame of a trailer. The method includes the steps of pivoting the frame relative to the earth about a first axis in a first direction of revolution; moving a low-friction support to a first position of engagement with the pontoon boat, said first position of engagement occurring prior to a second position of engagement between support blocks and pontoon boat; engaging the low-friction support with pontoon boat; maintaining low-friction support in first position of engagement responsive to the engaging step; displacing the pontoon boat relative to the low-friction support subsequent to the engaging step to thereby redistribute forces applied to the frame; pivoting the frame in a second direction of revolution opposite to the first direction of revolution responsive to the redistributed forces; and moving the low-friction support from the first position of engagement to a third position of engagement occurring subsequent to the second position of engagement, whereby the pontoon boat is supported upon the support blocks.

In a third manifestation, the invention is in combination, a pontoon boat having a deck and a plurality of pontoons thereunder with a pontoon trailer. The pontoon trailer includes a wheel carriage; a pivot axis; and a support carriage adjacent the wheel carriage and pivotal relative thereto about the pivot axis. The support carriage has a plurality of bunks for carrying a pontoon boat during transport. An actuator is anchored to the support carriage at a first end and to the wheel carriage at a second end for producing an actuating movement responsive to a pivotal motion between wheel carriage and support carriage. A roller set is positioned relative to support carriage responsive to the actuating movement between a first position carrying the pontoon boat and a second transport position releasing the pontoon boat.

OBJECTS OF THE INVENTION

Exemplary embodiments of the present invention solve inadequacies of the prior art by providing a self-loading and unloading trailer which can be operated by a single person to load a boat from difficult boat ramps or even directly from the ground. The trailer provides rollers for engaging the boat during loading and unloading of the boat, but safely rests the boat on bunks during transit. By incorporating the features of the present invention, the advantages of using a trailer for boat transport across land are preserved. These advantages include but are not limited to ready storage and rapid and simple retrieval from storage; and the ability to load and transport boats much longer than the motor vehicle.

A first object of the invention is to enable relatively safe loading, unloading, and transport of a pontoon boat using a trailer, and preserving the benefits attainable therewith. A second object of the invention is to load and unload a pontoon boat at ground level. Another object of the present invention is to unload a pontoon boat directly into a waterway and reload the boat therefrom while still maintaining vehicle drive wheels upon dry ground for good traction. A further object of the invention is to substantially reduce stress forces generated within the boat hull during loading, unloading and transport, to reduce the likelihood of damaging the boat during transport-related activities. Yet another object of the present invention is to alleviate damaging friction between bunk and boat during loading and unloading, while still obtaining the benefit of a bunk during transport. An additional object of the invention is to enable a single person to load, transport and unload a boat using the various embodiments of the invention.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 4 illustrates a preferred release mechanism for securing and releasing the preferred embodiment pontoon boat trailer from or to transporting position from a projected, exploded view.

FIG. 5 illustrates a preferred roller mechanism for assisting with the release of a pontoon boat transported upon the preferred embodiment pontoon boat trailer, from an end plan view.

FIG. 6 illustrates the preferred roller mechanism of FIG. 5 from a side plan view.

FIG. 7 illustrates the preferred embodiment pontoon supports from an end plan view, illustrating the preferred adaptability.

FIG. 8 illustrates a preferred end stop from a projected view.

DESCRIPTION OF THE PREFERRED EMBODIMENT

Figure 1:
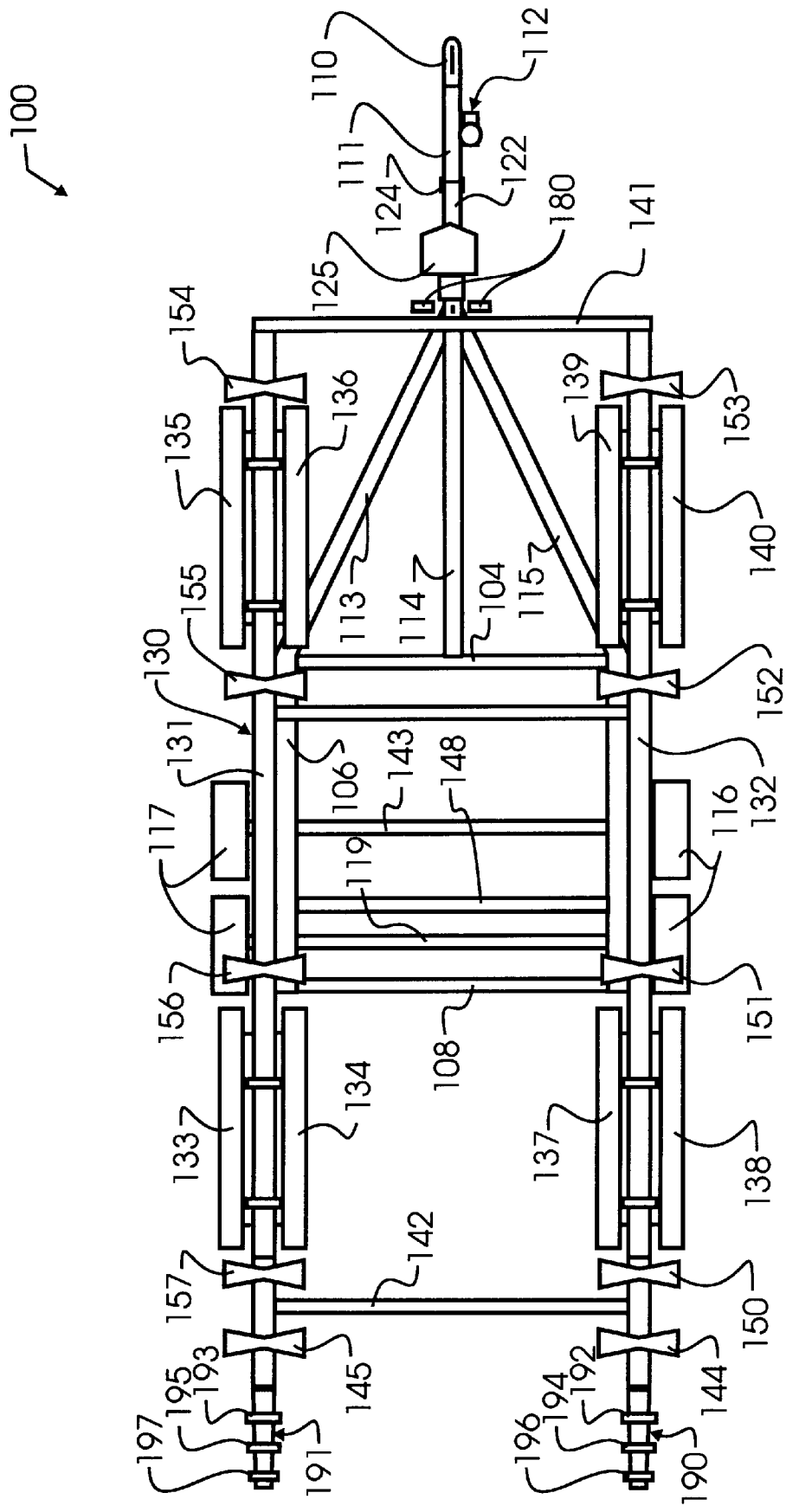
FIG. 1 illustrates a preferred embodiment pontoon boat trailer constructed in accord with the teachings of the invention from top plan view.

The present invention is manifested in a most preferred embodiment of the invention illustrated in FIG. 1. Therein, pontoon boat trailer 100 includes a standard coupling 110 for a ball-type hitch or the like. A tongue 111 extends therefrom, and has extending downwardly a jack or tongue support 112 upon which tongue 111 may be supported when coupling 110 is disconnected from a hitch. Onto tongue 111 is mounted a winch stand 120 having vertical support frame 121 and laterally extending frame brace 122. While not illustrated for clarity of invention, a ladder, steps or similar structure may be provided along with winch stand 120 to permit safe access to a boat transported upon trailer 100. Vertical frame 121 and frame brace 122 are most preferably slidably coupled to tongue 111 through sliding attachments 123, 124 respectively. The exact construction of sliding fasteners 123, 124 is not critical to the invention, and such fasteners as U-bolts, concentric tubing, bolts in slotted holes or other suitable adjustable methods of attachment to tongue 111 are contemplated herein. Distal to tongue 111 on vertical frame 121 is winch support 180, coupled to vertical frame 121 through fastener 126. Upon winch support 180 is winch 125, which may be hand-cranked or which may alternatively be powered by other means, including but not limited to electric or hydraulic drives. Wrapped about a shaft or pulley on winch 125 is cable 127, which will most preferably be a flaccid material of indeterminate length, sufficiently long in the most preferred embodiment to be used as a winch attached to a boat to be loaded upon pontoon boat trailer 100. Cable 127 may be manufactured from various metals, metal alloys or polymeric materials, and will most preferably be resistant to moisture and fraying, while also providing ample tensile strength for the present embodiment.

Extending from tongue 111 are three carriage support braces 113–115 in the general arrangement of a crow's foot. The arrangement and construction of these carriage support braces is not critical, so long as sufficient strength and stability is provided for supporting an intended load, such as a pontoon boat, while providing additional safety margins. These carriage support braces 113–115 connect into a rectangular undercarriage having sides 102, 104, 106, and 108. Supporting undercarriage sides 102–108 are wheels 116, 117 suspended from undercarriage sides 102, 106 by suitable suspension components such as axle 119 and leaf springs 118 at opposite ends of axle 119.

Figure 2:
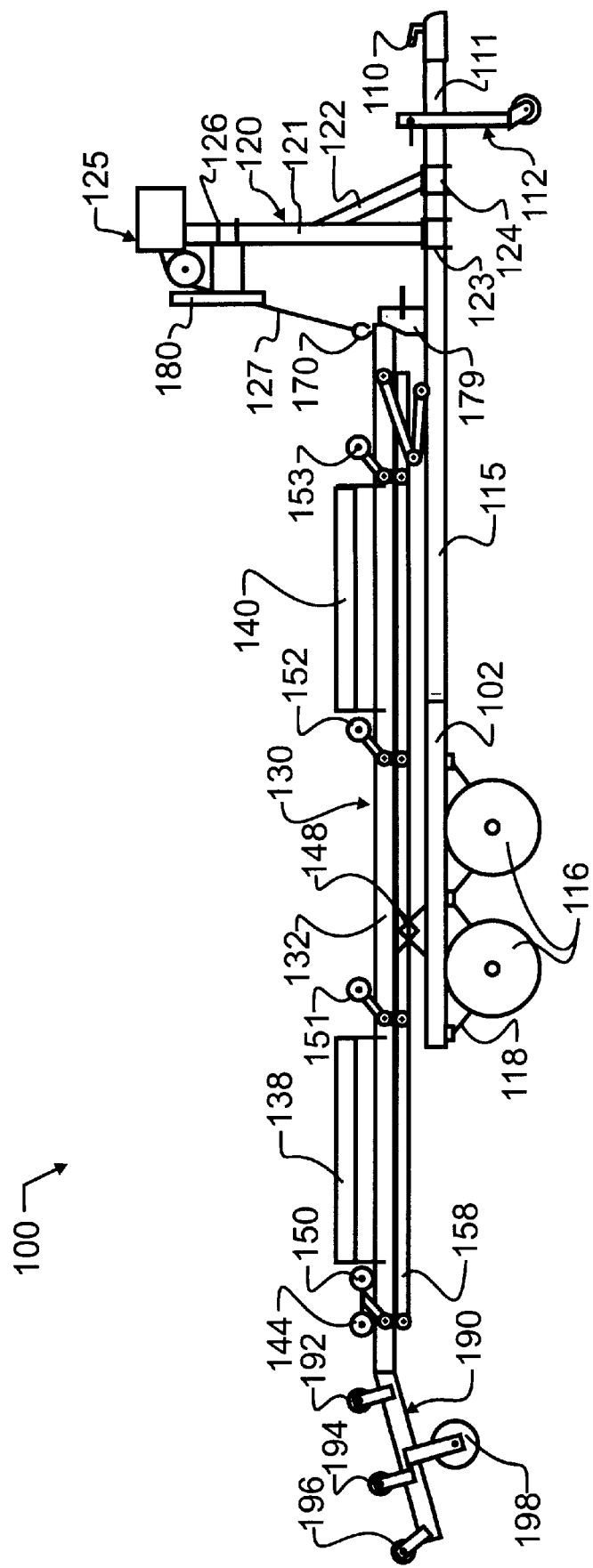
FIG. 2 illustrates the preferred embodiment pontoon boat trailer from a side plan view in a transporting position.
Figure 3:
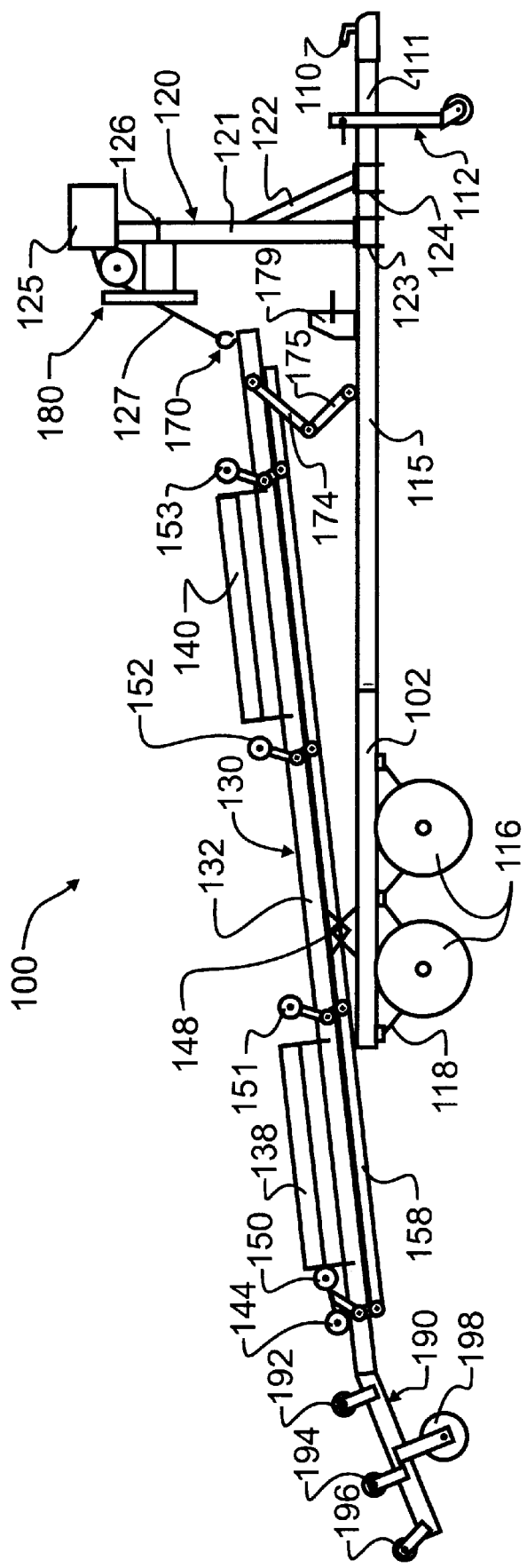
FIG. 3 illustrates the most preferred pontoon boat trailer in an unloading position from a side plan view.

Pivotally supported from undercarriage sides 102, 106 is pontoon support upper frame 130, having sides 131, 132 extending longitudinally parallel to tongue 111, front end 141, and back end 142. Additional crossbars such as crossbar 143 may be provided, although crossbar 143 may alternatively be replaced by or alternatively encompass a pivot axle 148. Axle 148 allows pontoon support upper frame 130 to rotate relative to undercarriage sides 102, 106 as is evidenced by FIG. 3, which illustrates pontoon support upper frame 130 rotated into a loading or unloading position. FIGS. 1 and 2 illustrate a transport or storage position, where pontoon support upper frame 130 extends in a plane generally parallel to undercarriage sides 102–108.

Along a top of pontoon support upper frame 130 are a number of pontoon bunk-type support blocks 133–140, which are designed to safely and securely support boat pontoons. The exact number arrangement of support blocks is not critical to the invention, and the geometries and counts will be determined in conjunction with the design of the boat to be transported. Advantageously, and as will be apparent, the present trailer provides no obstruction to the support of a triple pontoon, or other similar boat.

Support blocks 133–140 may be of any suitable materials, which in the preferred embodiment may have some frictional characteristics or may be specifically slippery, and may be slightly cushioning or compressible or rigid. These support blocks are most preferably sufficiently long to avoid damaging boat pontoons during transport over even the most rough of terrain. The width and thickness of support blocks 133–140 is again not critical, so long as support blocks 133–140 reasonably support boat pontoons and accommodate pontoons of slightly varying dimension. Contemplated materials include various treated lumbers, plastics or metals, whether coated or wrapped with secondary materials such as carpets or foams or left in the virgin or uncoated state.

In a contemplated embodiment, support sides 131, 132 of support frame 130 may be provided with slides, adjustments or other similar construction, whereby different boats maybe accommodated. As will be apparent, the addition of adjustable framework will not alter the basic function or operation of the invention, and will permit the embodiments to be used with a wider variety of watercraft.

Between undercarriage sides 102–108 and pontoon support upper frame 130 is adjustable roller frame 158, which supports there on rollers 150–157. Additional rollers 144, 145 are also fixedly attached to pontoon support upper frame 130 at the end distal to winch stand 120. Each of rollers 152–156 are constructed as roller 151, illustrated in FIGS. 5 and 6. A double-cone 160, which may preferably be fabricated from a durable and preferably slippery material such as hard plastic or the like, is designed to roll between frame members 161, 162, which are pivotally attached to pontoon support side 132 through pin 165. Extending at an angle from frame members 161, 162 but rigidly attached thereto, are frame members 163, 164 which terminate at holes 166, 167, which are designed to be pivotally attached through a pin or the like to roller frame 158. While rollers are the preferred embodiment illustrated herein, other low-friction arrangements and designs as are known in the art are contemplated herein.

Rollers 144 and 150 act as a single unit, as do rollers 145, 157. These rearward roller pairs are lowered adjacent support frame 130 during transport, but when tilted are raised therefrom. When raised, these rollers are designed to pivot at a point between. So, for example, rollers 144 and 150 will pivot such that when roller 144 raises, roller 150 lowers. This allows these roller pairs to follow the tilting of a pontoon boat as it climbs arms 190, 191 and then rolls forward onto the more forward rollers such as rollers 153, 154. A single roller does not support the load as well, without risking damage to the pontoons.

Roller frame 158 is moved relative to pontoon support upper frame 130 in a longitudinal direction, parallel to tongue 111, through an offset mechanism 177 shown in detail in FIG. 4. Offset mechanism 177 includes a rod 171 having tabs 172, 173 pivotally attached thereto at opposite ends, that allow rod 171 to be rotated about an axis parallel to the longitudinal axis of rod 171, while still following pontoon support upper frame 130 as frame 130 is raised or lowered adjacent winch stand 120. Arm 174 extends from rod 171, and is pivotally attached to roller frame 158, and to arms 175, 176, which are in turn pivotally attached through anchor 178 to tongue 111. When in transport position, arms 174–176 extend longitudinally parallel to tongue 111. However, upon release of latch key 179, which may take the illustrated form or any of the multitude of alternatives known in the art, and raising of rod 171 to the loading or unloading position illustrated in FIG. 3, arms 174–176 extend vertically, thereby pulling roller frame 158 forward relative to pontoon support upper frame 130. This movement of roller frame 158 relative to pontoon support upper frame 130 in turn causes frame members 161–164 to rotate about pin 165, raising frame members 161, 162 to a position normal to the general plane of pontoon support upper frame 130 as well. In the most preferred embodiment, frame members 161, 162 are sufficiently long that this rotation to normal elevates double-cones 160 above support blocks 133–140, in turn allowing a pontoon boat to be rolled off of blocks 133–140 on rollers 152–156, across roller pairs 144, 150 and 145, 157, across arms 191, 192 and onto any surface or into any body of water within reason, regardless of depth or elevation relative to wheels 116, 117.

When the preferred embodiment pontoon boat trailer 100 is used to load a pontoon boat from the earth, additional advantage is obtained. As aforementioned, the pontoon boats tend to be very heavy, and they do not slide on the ground. Nevertheless, the pontoons do typically have tapered conical portions at the ends which cooperate with arms 190, 191 and rollers 192–196 during loading. A normal loading sequence will be to pivot support upper frame 130 about pivot axle 148. This may be accomplished by attaching cable 137 to loop 170 and energizing winch 125. When fully pivoted, wheel 198 will engage the ground, which prevents arms 190, 191 from digging into the ground at the end thereof distal to loop 170. Next, pontoon boat trailer 100 will be backed up so that rollers 196, 197 engage with the front cones of the pontoon boat. The angle of arms 190, 191 will be adequate to create sufficient lifting force to pivot the pontoon boat relative to the earth. Furthermore, the friction between the boat and the earth will prevent any sliding therebetween. As pontoon boat trailer 100 is backed farther, the boat will continue to lift and ride progressively more upon support upper frame 130. At some point of balance, and whether initialed by winch or additional backing of pontoon boat trailer 100, the boat will shift forward onto rollers 151–156, by first pivoting about roller pairs 144, 150 and 145, 157. Finally, winch 125 through flaccid cable 127 will be used to pull the boat closer to winch 125. Again, when the center of gravity of the boat passes across pivot axle 148, support upper frame 130 will rotate back into a substantially parallel position with respect to undercarriage side 102. In the most preferred embodiment, pivot axle 148 will be positioned such that the crossing of the boat center of gravity will bring the pontoon boat into proper position with respect to the bunks 133–140, thereby setting the pontoon boat down onto the bunks without the need for further movement. Unloading onto the ground can be achieved by generally reversing the process, with the winch 125 raising support upper frame 130 to start the unloading. From there, the boat will be readily rolled off of trailer 100, and trailer 100 will be driven out from under the pontoons once the pontoons touch the ground in at least one place.

As should now be apparent, the preferred embodiment pontoon boat trailer 100 offers advantages perhaps greater than the prior art scissors type trailers in terms of loading and unloading ease, while improving upon those trailers very substantially in terms of safe transport for both the trailer and boat. Likewise, preferred embodiment pontoon boat trailer 100 also offers safe transport equal to or better than prior art bunk-type trailers, while substantially improving upon those trailers for loading and unloading ease. While in the preferred embodiment rollers 144, 145, 150–157, and 192–197 include double-cones 160, it is understood that any low-friction surface may be provided, including a roller surface, bearings, or intrinsically slippery materials that may not rotate or move at all.

FIG. 7 illustrates the adjustable angle mounts 146, 147 that support blocks 139, 140, to thereby accommodate different sizes of pontoons. FIG. 8 illustrates winch support 180 in greater detail, including boat stops 181, 182, framework 184 and roller 183 across which cable 127 may pass.

As is by now apparent, trailer 100 may be manufactured from a variety of materials, including metals, resins and plastics, ceramics, or even combinations, composites or coated combinations of the above. The specific material used may vary. A variety of designs have been contemplated herein and will be apparent to those skilled in the pontoon trailer art. The materials used for a particular design may be chosen not only based upon factors such as weather resistance and weight, but may also factor in the particular design. Other variations are also contemplated herein with regard to alternative embodiments. Consequently, while the foregoing details what is felt to be the preferred and additional alternative embodiments of the invention, no material limitations to the scope of the claimed invention are intended. The possible variants that would be possible from a reading of the present disclosure are too many in number for individual listings herein, though they are understood to be included in the present invention. Further, features and design alternatives that would be obvious to one of ordinary skill in the art are considered to be incorporated also.

We claim:

1. A boat trailer having support bunks which are active during boat transport for supporting a boat and having rollers that are moved during loading and unloading into an active position, comprising:

a trailer bed having a ground-engaging wheel;

a boat support frame having said support bunks and said rollers supported thereon;

a pivot between said boat support frame and said trailer bed about which said boat support frame may rotate relative to said trailer bed; and an actuator for elevating said rollers relative to said boat support frame responsive to a rotation between said boat support frame and said trailer bed.

2. The boat trailer of claim 1 wherein said boat is a pontoon boat having at least two pontoons.

3. The boat trailer of claim 1 wherein said actuator extends between said boat support frame and said trailer bed.

4. The boat trailer of claim 1 wherein said boat support frame may rotate relative to said trailer bed between a first position parallel thereto and a second position angularly offset there from.

5. The boat trailer of claim 1 wherein said rollers are elevated above said support bunks when said boat support frame is in said second angularly offset position relative to said trailer bed.

6. A method of loading a pontoon boat onto support blocks supported on a support frame of a trailer, comprising the steps of:

pivoting said frame relative to the earth about a first axis in a first direction of revolution;

moving a low-friction support to a first position of engagement with said pontoon boat, said first position of engagement occurring prior to a second position of engagement between said support blocks and said pontoon boat;

engaging said low-friction support with said pontoon boat;

maintaining said low-friction support in said first position of engagement responsive to said engaging step;

displacing said pontoon boat relative to said low-friction support subsequent to said engaging step to thereby redistribute forces applied to said frame;

pivoting said frame about said first axis in a second direction of revolution opposite to said first direction of revolution responsive to said redistributed forces; and moving said low-friction support from said first position of engagement to a third position of engagement occurring subsequent to said second position of engagement, whereby said pontoon boat is supported upon said support blocks.

7. The method of loading a pontoon boat onto support blocks of claim 6 wherein said step of moving further comprises the steps of:

displacing an actuating member responsive to said pivoting; and pivoting said rollers relative to said frame.

8. The method of loading a pontoon boat onto support blocks of claim 7 wherein said step of displacing further comprises displacing said actuating member longitudinally.

9. The method of loading a pontoon boat onto support blocks of claim 6 further comprising the steps of:

moving said low-friction support into engagement with said pontoon boat; and lifting said pontoon boat from said support blocks.

10. The method of loading a pontoon boat onto support blocks of claim 6 wherein said step of pivoting said frame further comprises winching said upper support frame at a first end.

11. In combination, a pontoon boat having a deck and a plurality of pontoons thereunder with a pontoon trailer comprising:

a wheel carriage;

a pivot axis;

a support carriage adjacent said wheel carriage and pivotal relative thereto about said pivot axis having a plurality of bunks for carrying a pontoon boat during transport;

an actuator anchored to said support carriage at a first end and to said wheel carriage at a second end for producing an actuating movement responsive to a pivotal motion between said wheel carriage and said support carriage; and a roller set positioned relative to said support carriage responsive to said actuating movement having a first position carrying said pontoon boat and a second transport position releasing said pontoon boat.

12. The combination pontoon boat and pontoon trailer of claim 11 further comprising a second roller set angled towards the earth relative to said first roller set, and including thereon a ground engaging wheel.

* * * * *